United States Patent Office 2,907,773
Patented Oct. 6, 1959

2,907,773

AMINO DERIVATIVES OF 4H-PYRAN-4-ONES

Carl Peter Krimmel, Mundelein, Ill., assignor to G. D. Searle & Co., Chicago, Ill., a corporation of Delaware No Drawing. Application October 2, 1957
Serial No. 687,609

8 Claims. (Cl. 260—345.9)

The present invention is concerned with basic derivatives of 4H-pyran-4-one and with non-toxic salts thereof. More particularly, it is concerned with compounds which, in the forms of free bases, can be represented by the structural formula

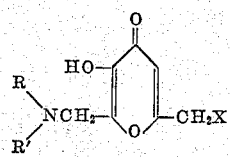

In this formula X can represent chlorine or a hydroxyl group. The terms R and R' represent lower alkyl radicals, such as methyl, ethyl, propyl, butyl, amyl, hexyl, heptyl, octyl, and branched-chain isomers thereof.

Suitable starting materials for the manufacture of compositions of this invention are compounds corresponding to the formula

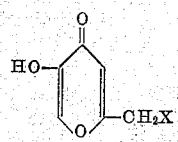

wherein X is defined as before. The specific compounds represented thereby are 2-chloromethyl-5-hydroxy-4H-pyran-4-one and 2-hydroxymethyl-5-hydroxy-4H-pyran-4-one, the latter compound being also known as kojic acid. Upon heating either of these compounds with aqueous formaldehyde and a mineral acid salt of a dialkylamine, or with aqueous formaldehyde, a dialkylamine and a mineral acid, condensation reactions take place with the formation of salts of this invention. The net effect of the condensation reactions is the introduction of a dialkylaminomethyl group at position 6 of the pyran ring. Thus, by heating a mixture comprising kojic acid, aqueous formaldehyde, and dimethylamine hydrochloride and suitably containing a slight excess of hydrochloric acid, followed by inducing crystallization in the cooled reaction mixture, the compound obtained is 2-hydroxymethyl - 5 - hydroxy-6-dimethylaminomethyl-4H-pyran-4-one hydrochloride. This compound and analogous compounds of this invention afford a distinct coloration upon treatment with ferric chloride in aqueous solution, thereby indicating the survival of a free enolic group in the reaction product.

Upon neutralization of the initially-formed mineral acid salts, the free bases of this invention result. For example, when a concentrated, aqueous solution of a hydrochloride is treated with approximately one molecular equivalent of potassium carbonate, and the mixture is evaporated until only a wet residue remains, the desired free base is recovered by extraction with isopropyl alcohol.

The organic bases of this invention form non-toxic, acid-addition salts with a variety of organic and inorganic acids. Such salts, formed by admixture of the organic free base with an acid, suitably in a neutral solvent, are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. For purposes of this invention the free bases are equivalent to their nontoxic acid-addition salts.

The organic bases of this invention, being amphoteric agents, also form salts with a variety of other bases. Such salts can be formed by admixture of an organic free base of this invention with a relatively strong base, in a neutral solvent. Suitable for the formation of salts of this type are alkali metal hydroxides and alkaline earth metal hydroxides such as potassium hydroxide, sodium hydroxide and calcium hydroxide. For purposes of this invention the free bases are equivalent to such non-toxic salts formed by interaction of the enolic hydroxyl group with a strong base.

The compositions of the present invention are easily manufactured substances having substantial water solubility, and are of value in various pharmacological applications. They are, in particular, cardiac stimulants effective in increasing the contractility of heart muscle. Upon their administration, increases in cardiac output and contraction amplitude are achieved. They also have hormonal properties. Thus, they are anti-inflammatory agents, as shown by their effectiveness in treating inflammation of the iris. Likewise, they also resemble cortisone and hydrocortisone in producing a decrease in vascular permeability, by increasing the resistance of the vascular wall to injury.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

*Example 1*

A slurry consisting of 32.1 parts of 2-chloromethyl-5-hydroxy-4H-pyran-4-one, 32.6 parts of dimethylamine hydrochloride, 33 parts of 36–38% formaldehyde, and 1.2 parts of concentrated hydrochloric acid is stirred and heated at about 90–100° C. for 3 hours. The resulting clear brown liquid is cooled, and crystallization is induced by such means as rubbing the wall of the reaction vessel with a glass rod or introducing into the mixture seed crystals of the hydrochloride of 2-hydroxymethyl-5-hydroxy-6-dimethylaminomethyl-4H-pyran-4-one, as obtained in Example 3. The crystalline precipitate which separates is collected on a filter, washed by suspension in 24 parts of cold, absolute ethanol, again collected on a filter, and washed on the filter with 16 parts of cold, absolute ethanol. Upon decolorization with activated carbon and recrystallization from absolute ethanol there are obtained white, water-soluble crystals of the hydrochloride of 2-chloromethyl-5-hydroxy-6-dimethylaminomethyl-4H-pyran-4-one. This compound melts with decomposition to a red-brown, frothy liquid at about 180–190° C. The free base has the structural formula

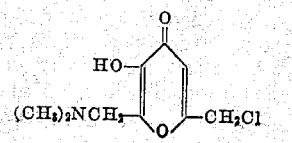

Example 2

A stirred mixture of 16 parts of 2-chloromethyl-5-hydroxy-4H-pyran-4-one, 30.8 parts of diethylamine hydrobromide, 16.5 parts of 36–38% formaldehyde and 0.4 part of concentrated hydrobromic acid is heated at about 90–100° C. for 1 hour. Crystallization is induced in the cooled reaction mixture, and the separated product is collected on a filter and washed with cold, absolute ethanol. This compound is the hydrobromide of 2 - chloromethyl - 5 - hydroxy-6-diethylaminomethyl-4H-pyran-4-one. The free base has the structural formula

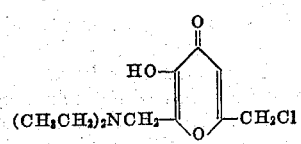

Example 3

A stirred mixture of 32.6 parts of dimethylamine hydrochloride, 28.4 parts of kojic acid, 20 parts of 36–38% formaldehyde and 1.2 parts of concentrated hydrochloric acid is heated under reflux for 3 hours. The clear, dark red-brown reaction mixture is cooled, and crystallization is induced by such means as rubbing the wall of the reaction vessel with a glass rod. The crystalline product which separates is collected on a filter and washed with absolute ethanol. The product is then decolorized with activated carbon and recrystallized from a mixture of 20 parts of water and 160 parts of ethanol. The compound thus obtained consists of white, water-soluble crystals of the hydrochloride of 2-hydroxymethyl-5-hydroxy - 6 - dimethylaminomethyl-4H-pyran-4-one which melt at about 189–193° C. with decomposition to a red-brown liquid. The free base which results from neutralization with sodium carbonate or potassium carbonate has the structural formula

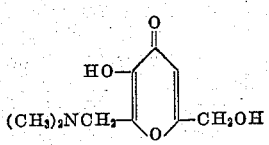

Example 4

A stirred mixture of 28.4 parts of kojic acid, 43.8 parts of diethylamine hydrochloride, 35.0 parts of 36–38% formaldehyde and 1.2 parts of concentrated hydrochloric acid is heated in an open vessel at about 90–100° C. for 4 hours. The evaporation which takes place during the heating period is continued until the mixture is converted to a viscous syrup. A small portion of the syrup is separated, and crystallization of this portion is induced by such means as spreading a film of it on a glass dish and rubbing the film with a glass rod. The bulk of the syrup is dissolved in 160 parts of absolute ethanol. This solution is slowly diluted with anhydrous ether until a persistent turbidity forms, whereupon the previously obtained seed crystals are introduced. Additional crystallization is promoted by further dilution with ether, by stirring, and by rubbing the wall of the container with a glass rod. When separation of the crystalline precipitate is complete, it is collected on a filter and dried. This product is then decolorized with activated carbon and recrystallized from isopropyl alcohol. The white, water-soluble compound obtained is the hydrochloride of 2-hydroxymethyl - 5 - hydroxy - 6 - diethylaminomethyl - 4H-pyran–4-one. It melts to an amber liquid at about 145–148° C.

A solution of 4 parts of this hydrochloride in 10 parts of water is treated with 1 part of potassium carbonate. The mixture is stirred until gas evolution ceases and a homogenous solution is obtained. Water is removed by evaporation or by vaporization under reduced pressure until only a wet residue remains. The residue is extracted with 40 parts of isopropyl alcohol, and the insoluble, inorganic compounds are removed by filtration. The filtrate is concentrated to a viscous, light-red, thermolabile syrup by vaporization of the isopropyl alcohol at or below room temperature, suitably with the aid of a stream of air or nitrogen. The syrup is extracted with 90 parts of warm benzene, and the solution is treated with activated charcoal and filtered. The pale buff-colored crystals which separate upon cooling are collected on a filter. This free base, 2-hydroxymethyl-5-hydroxy-6-diethylaminomethyl-4H-pyran-4-one, gives a red coloration upon treatment with ferric chloride in aqueous solution, and melts at about 94–96° C. to a red liquid. The structural formula is

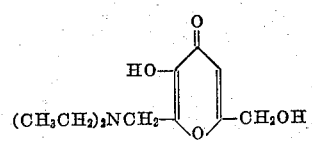

The sodium salt is obtained by treating an aqueous solution of 2 parts of the free base with 0.35 part of sodium hydroxide.

Example 5

A mixture of 28.4 parts of kojic acid, 20.2 parts of dipropylamine, 17.0 parts of 36–38% formaldehyde and 25.0 parts of concentrated hydrochloric acid is stirred and heated at about 90–100° C. for 4 hours. Seed crystals obtained by a conventional technique are introduced into the cooled reaction mixture. When separation of the insoluble product is complete, it is collected on a filter and washed with cold isopropyl alcohol. For purification, a solution of this crude product in a minimum quantity of hot isopropyl alcohol is diluted with about 4 times its volume of hot butanone, and the mixture is cooled and allowed to stand until recrystallization is complete. The product thus obtained consists of white, water-soluble needles which melt to a clear orange liquid at about 156–159° C. This compound is the hydrochloride of 2-hydroxymethyl-5-hydroxy-6-dipropylaminomethyl-4H-pyran-4-one. The free base, obtained by neutralization with potassium carbonate, has the structural formula

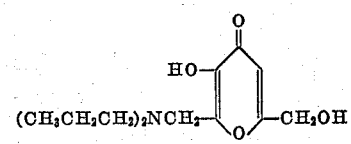

What is claimed is:
1. A compound of the structural formula

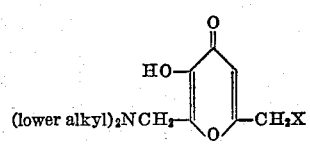

wherein X is a member of the class consisting of chlorine and the hydroxyl group.

2. A compound of the structural formula

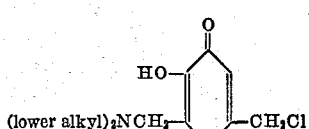

3. 2-Chloromethyl-5-hydroxy-6-dimethylaminomethyl-4H-pyran-4-one.

4. 2 - Chloromethyl-5-hydroxy-6-diethylaminomethyl-4H-pyran-4-one.

5. A compound of the structural formula
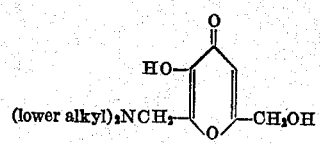
6. 2-Hydroxymethyl-5-hydroxy-6-dimethylaminomethyl-4H-pyran-4-one.
7. 2-Hydroxymethyl-5-hydroxy-6-diethylaminomethyl-4H-pyran-4-one.
8. 2-Hydroxymethyl-5-hydroxy-6-dipropylaminomethyl-4H-pyran-4-one.
References Cited in the file of this patent
Spielman et al.: J. Am. Chem. Soc., vol. 69, pp. 2908 and 2909 (1947).
Woods: J. Am. Chem. Soc., vol. 68, p. 2744 (1946).
Elderfield: Heterocyclic Cmpds., vol. 1, pp. 386 and 387, Wiley (1950).